Aug. 15, 1961     E. A. SWEETMAN     2,996,601
TREATMENT OF METAL ARTICLES BY ELECTRO-SPARK EROSION
Filed Feb. 17, 1958     2 Sheets-Sheet 1

Inventor
E. A. Sweetman

United States Patent Office 2,996,601
Patented Aug. 15, 1961

2,996,601
TREATMENT OF METAL ARTICLES BY ELECTRO-SPARK EROSION
Ernest Albert Sweetman, Kenilworth, England, assignor to Wickman Limited, Coventry, England
Filed Feb. 17, 1958, Ser. No. 715,768
Claims priority, application Great Britain Feb. 25, 1957
2 Claims. (Cl. 219—69)

This invention relates to the cutting or shaping of metal articles, and particularly articles made from hard metals by the method of electric-spark erosion.

The object of the invention is to expedite cutting operations by the said method, and enable improved surface finishes to be obtained.

The invention includes an apparatus wherein the work holder is mounted with a restricted freedom of movement in the direction of feed of the electrode, and has combined with it means for imparting rapid vibratory movements to the work holder in the said direction.

In the accompanying drawings.

Figure 1:
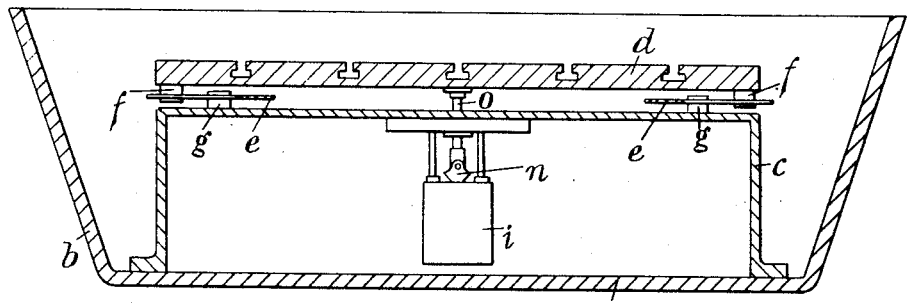
FIGURE 1 is a cross section of a portion of an apparatus embodying the invention.
Figure 2:
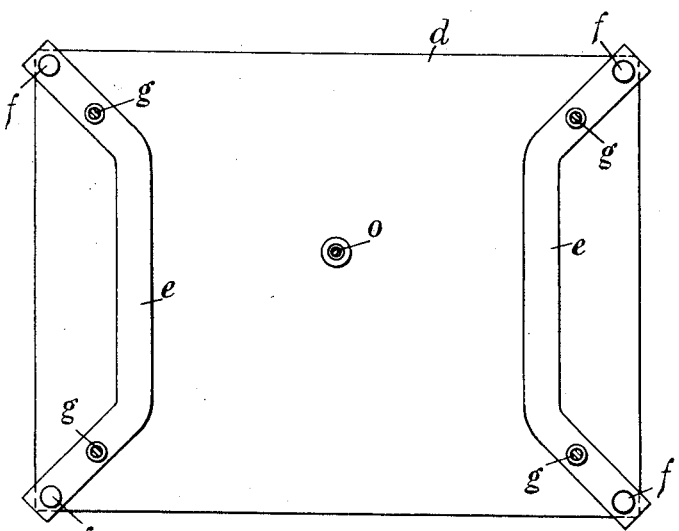
FIGURE 2 is an inverted plan of the work holder.
Figure 3:
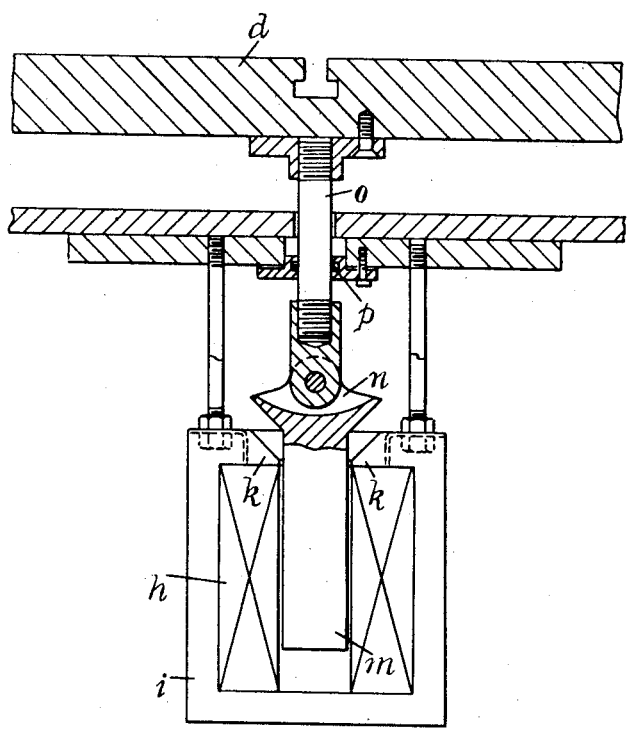
FIGURE 3 is a sectional elevation illustrating a suitable electromagnet for actuating the work holder.

Referring to the drawings, there is mounted on the base $a$ of a tank $b$ which contains the liquid dielectric used in the operation, a rigid support $c$ for a table $d$ which serves as the work holder. The table is attached to the support by a pair of spring blades $e$ arranged parallel with each other. Each end of each blade is cranked in its own plane as shown and is attached to the table by studs $f$. Also each blade is secured to the support by studs $g$ arranged as shown:

The required vibratory movement is imparted to the table by any convenient electromagnetic means. In the example illustrated by FIGURE 3, this comprises a solenoid having a winding $h$ which is embraced by iron laminations $i$ shaped at one end to form pole pieces $k$. The movable iron core $m$ of the solenoid has formed on it a head $n$ adapted to co-operate with the said pole pieces, the head being connected to a link $o$ which passes through a seal $p$ in the support $c$ and is secured to the table $d$. The solenoid winding is supplied with alternationg or intermittent current at a frequency which is rather less than the resonance frequency of the movable mass comprising the table, spring blades and solenoid core, this mass being large relatively to that of the workpiece.

The amplitude of the vibratory movement imparted by the solenoid to the table found to give the desired results is, in one example, about 0.0005 of an inch, this being about one half of the average length of the spark gap between the electrode and work piece.

The arrangement of spring blades above described not only enables the vibratory movements to be imparted to the table in a convenient manner but also prevents undesired lateral movements of the table, so ensuring that movements of the table shall be confined to the direction of the feed movements of the electrode.

The invention is not, however, restricted to the example above described. If desired the vibratory movements may be imparted by other means, such as rotary cams, or by wave motions in a hydraulic vibrator.

Having thus described my invention what I claim as new and desire to secure by Letters Patent is:

1. A work-piece vibrator for electric spark-erosion apparatus, comprising in combination a work holder having a work-supporting surface, a mounting permitting restricted freedom of movement of the work holder in a direction normal to the work-supporting surface thereof, which mounting includes a stationary base, a pair of laterally spaced and equally dimensioned leaf-springs having laterally cranked end portions and situated adjacent opposite margins respectively of the work holder with the broader surfaces of the springs in planes parallel to the work-supporting surface of the work holder, and with the corresponding cranked end portions disposed to resemble mirror images of each other, means securing the springs to the base at positions adjacent the junctions of the cranked end portions and the other portions of the springs, and studs respectively securing the cranked end portions of the springs to the adjacent marginal portions of the work holder, and means for imparting rapid vibratory motion to the work holder in the said direction at a frequency somewhat lower than the resonance frequency of the work holder, the last mentioned means and the springs, and at an amplitude of a few ten-thousandths of an inch.

2. A work-piece vibrator for electric spark-erosion apparatus, comprising in combination a work holder having a work-supporting surface, a mounting permitting restricted freedom of movement of the work holder in a direction normal to the work-supporting surface thereof, which mounting includes a stationary base, a pair of laterally spaced and equally dimensioned leaf-springs having laterally cranked end portions and situated adjacent opposite margins respectively of the work holder with he broader surfaces of the springs in planes parallel to the work-supporting surface of the work holder, and with the corresponding cranked end portions mutually divergent, means securing the springs to the base at positions adjacent the junctions of the cranked end portions and the other portions of the springs, and studs respectively securing the cranked end portions of the springs to the adjacent marginal portions of the work holder, and means for imparting rapid vibratory motion to the work holder in the said direction at a frequency somewhat lower than the resonance frequency of the work holder, the last mentioned means and the springs, and at an amplitude of .0005 inch.

References Cited in the file of this patent

UNITED STATES PATENTS

| | | |
|---|---|---|
| 2,066,588 | Taylor | Jan. 5, 1937 |
| 2,078,310 | Bennett | May 4, 1937 |
| 2,273,819 | Cooke et al. | Feb. 24, 1942 |
| 2,490,302 | Halfelder | Dec. 6, 1949 |
| 2,908,801 | Cresswell | Oct. 13, 1959 |
| 2,945,936 | Carman | July 19, 1960 |

FOREIGN PATENTS

| | | |
|---|---|---|
| 1,167,320 | France | July 7, 1958 |